United States Patent
Wright (10) Patent No.: US 9,457,706 B2
(45) Date of Patent: Oct. 4, 2016

(54) TIE-DOWN APPARATUS

(71) Applicant: Edwin A. Wright, Arvada, CO (US)

(72) Inventor: Edwin A. Wright, Arvada, CO (US)

( * ) Notice: Subject to any disclaimer, the term of this patent is extended or adjusted under 35 U.S.C. 154(b) by 0 days.

(21) Appl. No.: 14/750,792

(22) Filed: Jun. 25, 2015

(65) Prior Publication Data

US 2015/0291079 A1   Oct. 15, 2015

Related U.S. Application Data

(63) Continuation of application No. 14/065,406, filed on Oct. 28, 2013, now Pat. No. 9,096,159.

(51) Int. Cl.
  *B60P 7/08* (2006.01)
  *B60P 3/079* (2006.01)

(52) U.S. Cl.
  CPC .............. *B60P 7/0869* (2013.01); *B60P 3/079* (2013.01); *B60P 7/0846* (2013.01); *B60P 7/0853* (2013.01); *B60P 7/083* (2013.01)

(58) Field of Classification Search
  CPC ..... B60P 7/0869; B60P 7/083; B60P 7/0853; B60P 7/0846; B60P 3/079

USPC .............. 410/12, 96, 97, 100, 103; 254/213; 24/68 CD, 70 ST, 69 ST, 69 CT, 71 ST, 24/302; 248/499
See application file for complete search history.

(56) References Cited

U.S. PATENT DOCUMENTS

| 5,090,503 A | * | 2/1992 | Bell | .................................. | 182/5 |
| 6,065,915 A | * | 5/2000 | Ruehl et al. | .................... | 410/36 |
| 7,165,294 B2 | * | 1/2007 | Surdam | | |
| 9,096,159 B2 | * | 8/2015 | Wright | .......................... | 410/103 |

* cited by examiner

*Primary Examiner* — Stephen Gordon (57) ABSTRACT

In one example, a tie-down apparatus can include a tie-down device and a housing adapted to receive the tie-down device. The tie-down apparatus can be transitionable between a stowed state and a deployed state. In the stowed state, the tie-down device can be stored entirely within the housing. The stowed state can be convenient for storing the tie-down device when not in use. In the deployed state, certain portions of the tie down device can be concealed within the housing while other portions of the tie-down device (e.g. attachment mechanisms) are deployed through openings in the housing. The deployed state can be convenient for securing cargo without damaging (e.g. scratching or denting) the cargo.

19 Claims, 10 Drawing Sheets

TIE-DOWN APPARATUS

CROSS-REFERENCE TO RELATED APPLICATION

This application is a continuation of U.S. Pat. No. 9,096,159 issued on Aug. 4, 2015, which is incorporated by reference in its entirety.

FIELD

The present disclosure relates to methods and apparatuses for securing cargo. More specifically, the present disclosure relates to tie-down apparatuses for securing cargo and methods for securing cargo with tie-down apparatuses.

BACKGROUND

When transporting or storing cargo, tie-down devices are commonly used to secure the cargo in place. Ratchet straps are a popular type of tie-down device, and are often used to secure cargo to railroad cars, flatbed trailers, and pickup truck beds. In many commercial trucking applications, ratchet straps have replaced traditional jute ropes, chains, and wires because they are easier to install and uninstall than other forms of tie-down devices. During installation, a ratchet strap is first secured to a first attachment point and then draped over the cargo and attached to a second attachment point. A ratchet assembly of the ratchet strap is then actuated to take up slack in the strap to tension the strap across the cargo. Once tensioned, the ratchet strap helps to secure the cargo in place and prevent shifting of the cargo during transport.

DETAILED DESCRIPTION

Figure 13:
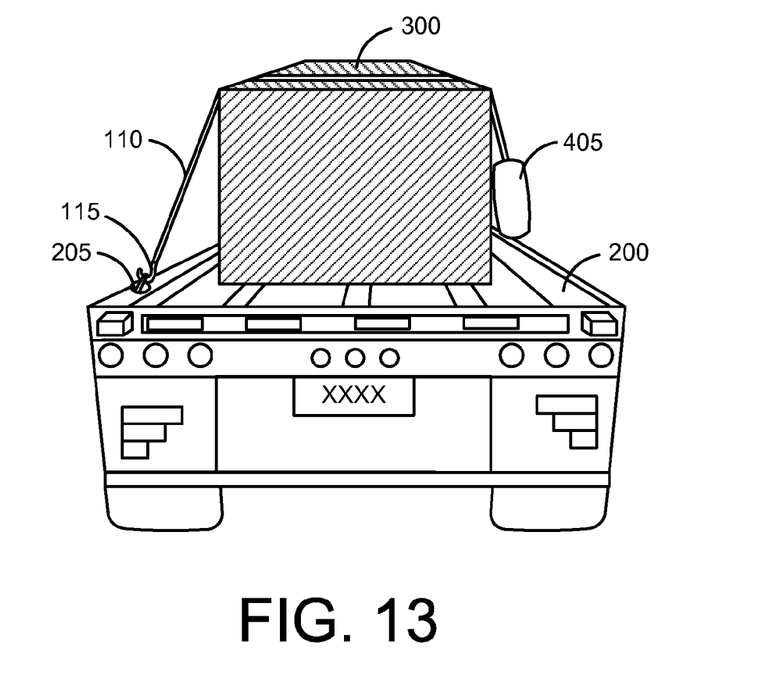
FIG. 13 shows a tie-down apparatus in a partially deployed state with a first attachment mechanism of a tie-down device secured to a first attachment point on a cargo platform and a piece of cargo resting on the cargo platform.
Figure 14:
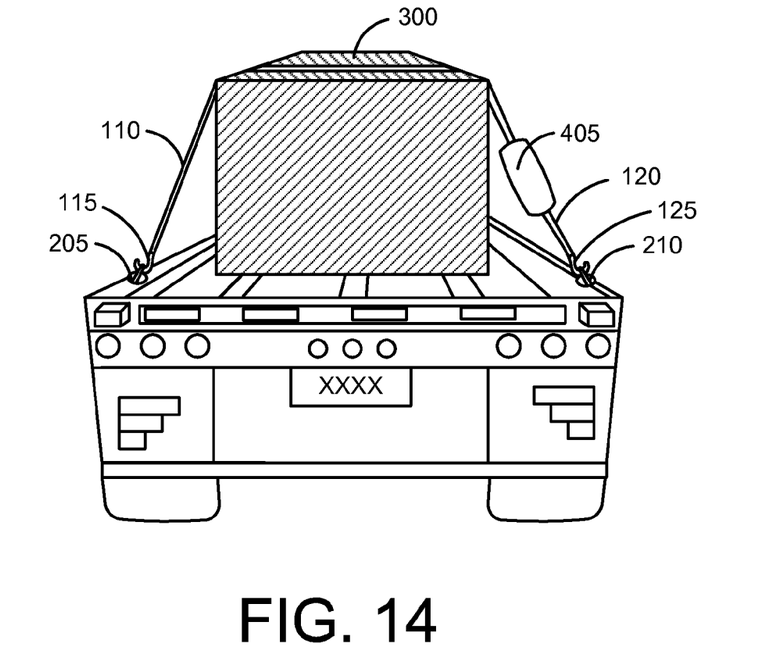
FIG. 14 shows a tie-down apparatus in a fully deployed state, where the tie-down apparatus is secured to a first attachment point and a second attachment point on the cargo platform and where the tie-down apparatus is tensioned to secure a piece of cargo to the cargo platform.
Figure 15:
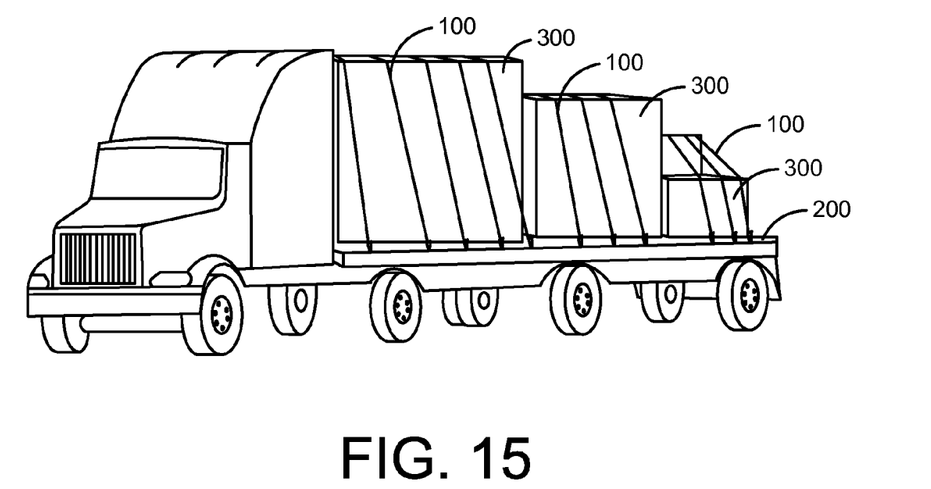
FIG. 15 shows several pieces of cargo secured to a flatbed trailer by a plurality of tie-down devices.
Figure 16:
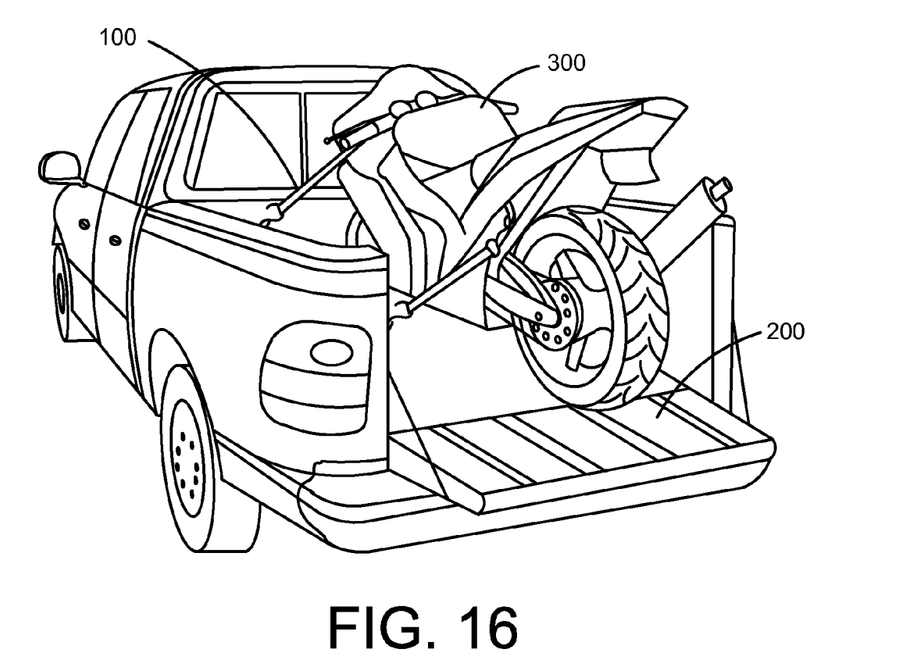
FIG. 16 shows a motorcycle secured to a pickup truck bed by a plurality of tie-down devices.

Tie-down devices 100 can be used to secure cargo 300 during transport or storage. Cargo can include, for example, vehicles, household goods, equipment, or machinery being transported on, for example, flatbed trucks or trailers or inside moving vans or semi trailers. FIGS. 13-16 show a variety of cargo being transported using commercial and personal vehicles. Specifically, FIGS. 13-15 show nondescript cargo 300 being transported on a commercial flatbed semi trailer, and FIG. 16 shows a motorcycle being transported with a personal vehicle. In each case, the cargo 300 is secured to a cargo platform 200 using one or more tie-down devices 100 that are connected to attachment points (e.g. 205, 210) affixed to the cargo platform.

Figure 1:
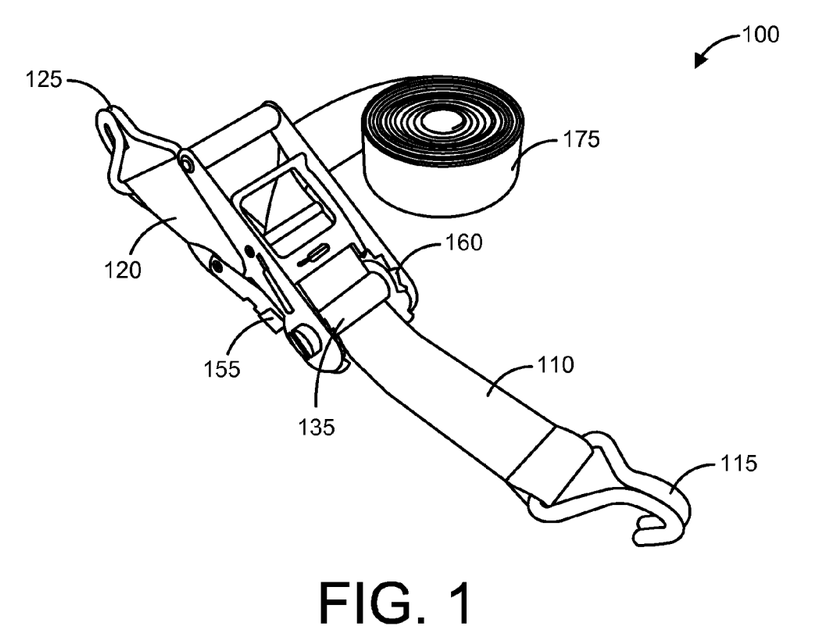
FIG. 1 is a perspective view of a ratchet strap.

Examples of tie-down devices 100 include ratchet straps, winch straps, motorcycle tie downs, cam buckle straps, military ratchet straps, automotive tie down straps, tent straps, axle tie down straps, L-track ratchet straps, and E-track ratchet straps. FIG. 1 shows an example of a tie-down device 100 known as a ratchet strap. The ratchet strap 100 can include a ratchet assembly 105. The ratchet assembly 105 can be any suitable type of ratchet assembly. In one example, the ratchet assembly 105 can include a ratchet body 155 having a first end 140 and a second end 145. The ratchet assembly 105 can include a ratchet handle 130 attached to the ratchet body 155 by a ratchet axle 135. The ratchet axle 135 can be transversely mounted within the ratchet body 155, and a pair of ratchet wheels 160 can be mounted to the ratchet axle 135. The ratchet axle 135 can be rotatably supported within the ratchet body 155 near a first end 140 of the ratchet body. The ratchet axle can be rotated by actuating the ratchet handle in an up and down motion, shown as directions A and B, respectively, in FIG. 2. In one example, the ratchet assembly 105 can be similar to a ratchet assembly described in U.S. Pat. No. 5,426,826 to Takimoto, which is hereby incorporated by reference in its entirety.

The ratchet strap 100 can include a first strap 110 and a second strap 120. The second strap can be a fixed length strap 120 that is attached to the second end 145 of the ratchet body 155. The first strap can be an adjustable length strap 110 that is attached near the first end 140 of the ratchet body 155. The first and second straps (110, 120) can be made of any suitable material that has sufficient strength, durability, and flexibility to secure cargo at highway speeds on an open-air cargo platform 200. In one example, the first and second straps can be made of woven polyester fabric or other synthetic or natural fibers. Depending on the cargo being transported, the first and second straps (110, 120) can be selected to have rated breaking strengths of about 1,500, 3,000, 5,000, or 10,000 pounds.

The adjustable length strap 110 can include an attachment mechanism 115 at a distal end of the strap. The attachment mechanism 115 can be any suitable type of attachment mechanism that is capable of securing the adjustable length strap 110 to an attachment point, such as a D-ring on a trailer. The attachment mechanism can be, for example, a wire hook, flat hook, snap hook, chain link, eye sling, claw hook, delta link, flat snap hook, half-twist eye sling, J hook, or double J hook, as shown in FIG. 1. Similarly, the fixed length strap 120 can include an attachment feature 125 at a distal end. The attachment feature 125 can be any suitable type of attachment mechanism such as, for example, a wire hook, flat hook, snap hook, chain link, eye sling, claw hook, delta link, flat snap hook, half-twist eye sling, J hook, or double J hook, as shown in FIG. 1.

Figure 2:
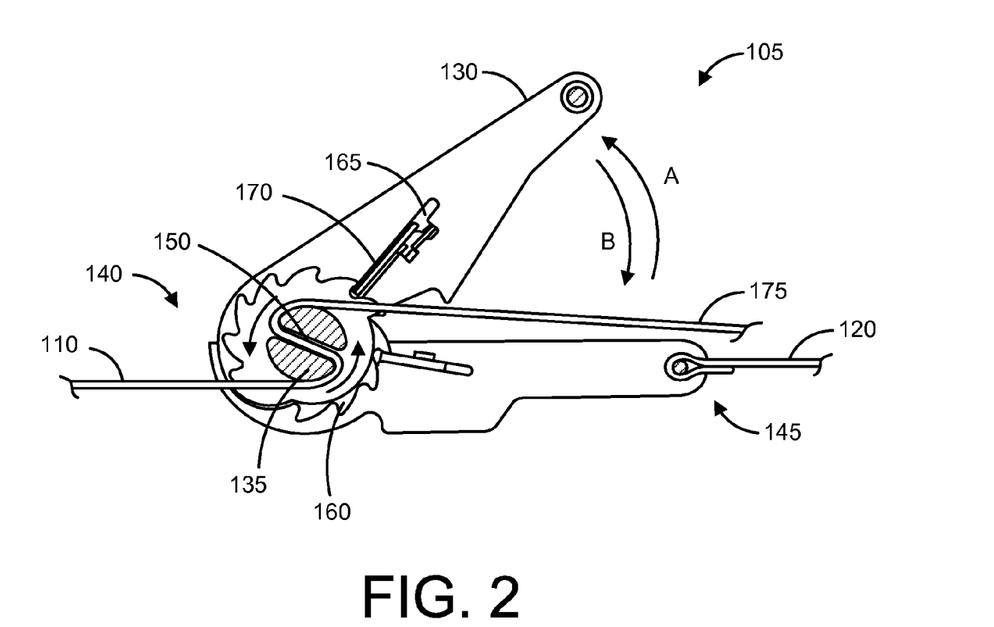
FIG. 2 is a cross-sectional side view of a ratchet assembly of a ratchet strap.
Figure 3:
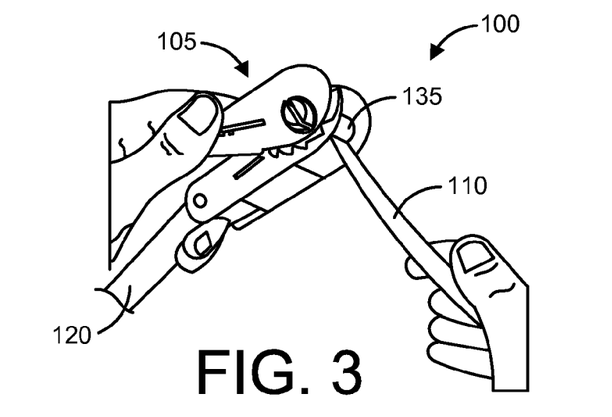
FIG. 3 is a perspective view of a user inserting an end of a first strap into a ratchet axle of a ratchet assembly.
Figure 4:
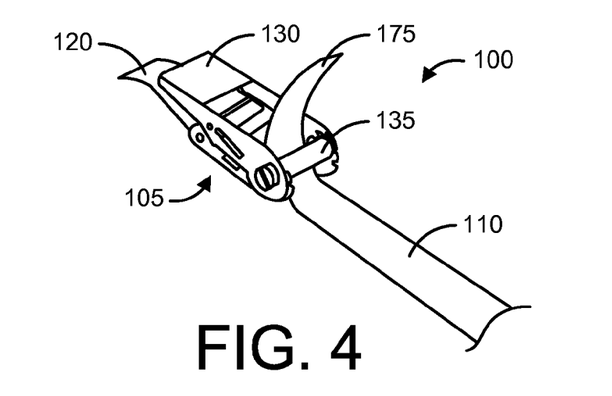
FIG. 4 is a perspective view of a first strap inserted into a ratchet axle of a ratchet assembly.
Figure 5:
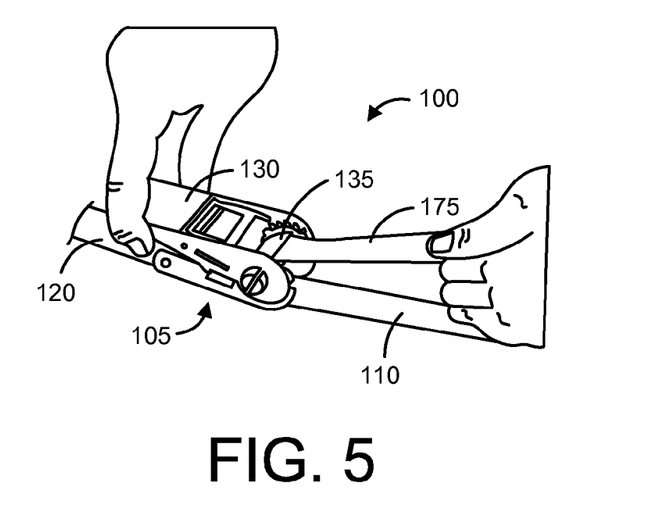
FIG. 5 shows a perspective view of a user operating a ratchet handle of a ratchet assembly to tension a tie-down device.

The adjustable length strap 110 can attach to the ratchet assembly 105 near the first end 140 of the ratchet assembly. Specifically, the adjustable length strap 110 can attach to the ratchet assembly 105 by feeding the adjustable length strap through a split in the ratchet axle 135, as shown in FIGS. 3 and 4. During use, the adjustable length strap can be drawn taught through the ratchet axle 135, as shown in FIG. 5, and the ratchet handle 130 can then be actuated to take up slack in the adjustable length strap 110, as shown in FIG. 2. More specifically, when the ratchet handle 130 is moved in direction A, as shown in FIG. 2, the ratchet handle engages the ratchet wheels 160, which thereby rotate the ratchet axle 135 in direction A. As the ratchet axle 135 rotates, it winds a portion of the adjustable length strap 110 onto the ratchet axle 135. When the ratchet handle 130 has moved the maximum extent in direction A, the ratchet handle 130 disengages from the ratchet wheels 160, and the ratchet wheels are then locked by a ratchet locking mechanism 170. The ratchet handle 130 can then be moved in direction B, which is opposite of direction A. When the ratchet handle 130 is moved in direction B to the maximum extent, the ratchet handle re-engages the ratchet wheels, and the ratchet wheels are unlocked so that the ratchet handle can again be moved in direction A. As a result, a portion of the adjustable length strap 110 is wound onto the ratchet axle 135, thereby shortening a portion of the strap 110 extending between the ratchet axle and the first attachment mechanism 115 and tensioning the ratchet strap 100, so long as the first and second attachment mechanisms (115, 125) are attached to a first and second attachment point (205, 210), respectively.

The ratchet assembly 105 can include a release handle 165. The release handle 165 can be used to release tension from the ratchet strap 100 to facilitate removal of the ratchet strap when unloading the cargo 300. When actuated, the release handle 165 can decouple the locking ratchet mechanism 170 from the ratchet wheels 160, thereby permitting the ratchet axle 135 to spin freely and to unwind a portion of the adjustable length strap 110, and once unwound from the ratchet axle, then permitting the adjustable length strap to be pulled through the split in the ratchet axle, thereby lengthening a portion of the strap 110 extending between the ratchet axle and the first attachment mechanism 115.

Existing tie-down devices have several drawbacks. For instance, tie-down devices, such as ratchet straps 100, are a hassle to store, since there is no convenient way to neatly wrap the ratchet straps for future use. Typically, ratchet straps 100 are simply balled up after use, which makes them difficult to use in the future, since the straps must first be untangled and untwisted before they can be used again. This problem is compounded by the fact that ratchet straps are rarely used one at a time. Commonly, at least two ratchet straps 100 are used to properly secure cargo, and after use, the set of ratchet straps are balled up together, which increases the amount of time and patience required to separate and sort out the ratchet straps when used next.

Tie-down devices have other drawbacks. Tie-down devices, such as ratchet straps, include metal portions (e.g. ratchet assembly 105 and hooks 115, 125) that can scratch and dent the cargo being secured. For example, the metal portion can scratch the paint or dent a body panel of a classic automobile being transported to an auto show, thereby reducing the vehicle's value. Also, when the tie-down device 100 is tensioned using, for example, a ratchet assembly 105, the adjustable strap portion 110 produces an excess strap portion 175 that is unsecured, as shown in FIG. 1. If left unsecured, the excess strap portion 175 will flap freely against the cargo 300 and can damage the cargo (e.g. dents or damage to paint or surface finishes). Even when efforts are made to secure the excess strap portion 175, often the results are unsuccessful. For example, even when the excess strap portion 175 is initially secured prior to highway transport, highway wind speeds can often loosen and free the excess strap material, resulting in unintended damage to the cargo 300 caused by the flapping strap.

Tie-down devices have still other drawbacks. Tie-down devices are often used to secure cargo on flatbed trucks and trailers. Flatbed trucks and trailers leave the cargo, and tie-down straps, exposed to the elements and road debris. For example, tie-down straps are left exposed to rain, snow, sleet, mud, dirt, and road salt as well as freezing temperatures, which can each adversely affect the operation of the tie down strap. Most notably, freezing temperatures combined with precipitation can result in freezing of the ratchet assembly 105. When the ratchet assembly 105 is frozen, an operator is unable to release the ratchet assembly and is, therefore, prevented from removing the tie-down strap 100 and unloading the cargo 300. A frozen tie-down device 100 can cost a driver time and money, and can disrupt the driver's schedule and damage the driver's reputation.

Efforts have been made to overcome the drawbacks described above, but those efforts have fallen short. For instance, a tie-down apparatus is described in U.S. Pat. No. 7,681,286 to Lewis et al. The tie-down apparatus similar to the apparatus described in Lewis is commercially available through Kinedyne Corporation and is sold under the trademark STRAPPAK. Lewis discloses a device for securing a free end of a tie-down device. Specifically, Lewis discloses an apparatus with a storage bag attached to a ratchet strap. The ratchet strap includes a first strap portion having a fixed end, a second strap portion having a free end, and a buckle assembly fixedly connected to the first strap portion and adjustably connected to the second strap portion. The storage bag is connected to the first strap portion near the fixed end, and the free end of the second strap portion is receivable in the storage bag. The ratchet strap also includes a buckle assemble fixedly connected to the first strap portion and adjustably connected to the second strap portion. The buckle assembly includes a first buckle portion connected to a second buckle portion, and movement of the first buckle portion with respect to the second buckle portion is operable to selectively close the storage bag. Although Lewis provides an apparatus that prevents the free end of the second strap from flapping wildly and causing damage to cargo during transport, Lewis fails to teach or suggest a storage bag that prevents damage to the cargo 300 caused by movement or vibration of the metallic buckle assembly against the cargo. In fact, for the apparatus in Lewis to properly secure the free end of the second strap, the ratchet handle of the buckle assembly presses against an outer surface of the storage bag to keep an opening in the bag sealed (see, e.g. FIG. 4 of Lewis). Therefore, when securing a load, it is not possible for the apparatus in Lewis to secure the free end of the second strap while also protecting the cargo 300 from damage caused by the metallic buckle assembly. The buckle assembly in Lewis is exposed to the elements, and is susceptible to freezing in wintery conditions.

Another tie-down apparatus that falls short is described in U.S. Pat. No. 7,165,294 to Surdam. Although the cargo tie-down apparatus described in Surdam includes a covering that prevents the ratchet assembly from scratching the cargo, the tie-down apparatus does not permit a user to rapidly deploy the tie-down apparatus or to quickly and easily retighten the tie-down apparatus if it becomes loose. During installation, the user must be careful to avoid striking the cargo with the metal hooks. This means the user must carefully drape the cargo tie-down apparatus over the cargo and attach the first and second hooks to attachment points located, for example, on a flatbed trailer. The user must then carefully tighten the ratchet assembly without the assembly rolling over and must then follow a sequence of folding steps to secure the excess strap material to prevent it from flapping against the cargo during transit. In particular, the "[e]xcess strap 12 remaining after the tightening operation is fed into the sack 21. The free end flap is then folded 180° over the locking mechanism as indicated by arrow (1) in FIG. 2. The sack 21 is then folded 180° over the locking mechanism 10, as illustrated by arrow (2) in FIG. 2. One end 20B is then folded 180° over onto the sack 21, as illustrated by arrow (3) in FIG. 2. The opposite end 20A is then folded 180° onto the end 20B as illustrated by arrow (4) in FIG. 2. The hook and loop strips thereby contact each other and engage, securing the housing over the locking mechanism and sack 21, to form an enclosed protective housing as shown in FIG. 3." See col. 4, lines 2-13 of Surdam. The sequence of folding steps described in Surdam take considerable time, especially when many straps are used to secure the cargo, since the sequence of folding steps must be repeated for each tie-down apparatus. During transit, it is common for an operator to check and retighten the tie-downs, which may loosen if the cargo 300 shifts even slightly. To retighten the cargo tie-down apparatus described in Surdam, the operator must follow the sequence of folding steps in reverse order to access the ratchet assembly to permit ratcheting (i.e. tightening of the tie-down apparatus), and must then follow the sequence of folding steps to re-secure the excess strap material.

As those skilled in the art are aware, it is common for the ratchet assembly to twist or roll unexpectedly when tensioning the tie-down device, especially when securing irregularly-shaped cargo or when securing the attachment mechanisms to attachment points on the cargo platform that produces partial twists in the first or second straps. Therefore, the apparatus described in Surdam poses a significant risk of damaging the surface of the cargo during an installation process, since the top and side portions of the metal ratchet assembly are exposed during the installation process and would damage the cargo if the ratchet assembly twists or rolls before the operator has a chance to secure the protective housing.

To overcome the many drawbacks of the existing tie-down devices and apparatuses described above, a tie-down apparatus 400 for securing cargo 300 has been developed. In one example, the tie-down apparatus 400 can include, in combination, a tie-down device 100 and a housing 405 adapted to receive the tie-down device. The tie-down apparatus 400 can be transitionable between a stowed state and a deployed state. When in the stowed state, the tie-down device 100 can be stored entirely within the housing 405. The stowed state can be convenient for storing the tie-down device 100 when not being used. When in the deployed state, portions of the tie down device (e.g. ratchet assembly 105) can be stored within the housing 405 while other portions of the tie-down device (e.g. hooks) are deployed through openings (e.g. slits) in the housing 405. The deployed state can be convenient for securing cargo 300 without damaging (e.g. scratching or denting) the cargo.

Figure 6:
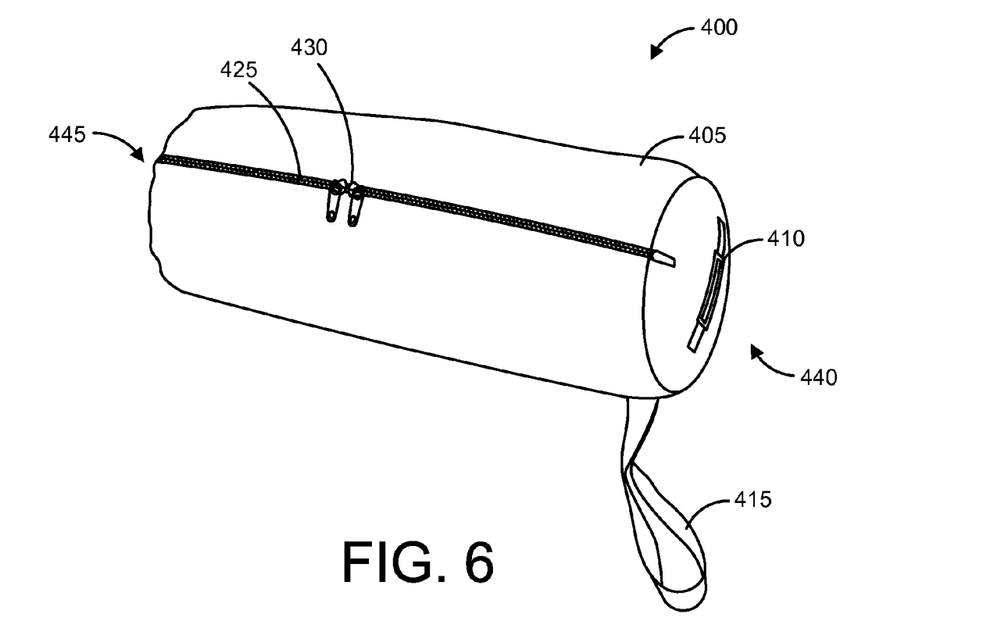
FIG. 6 shows a perspective view of a tie-down apparatus in a stowed state.
Figure 7:
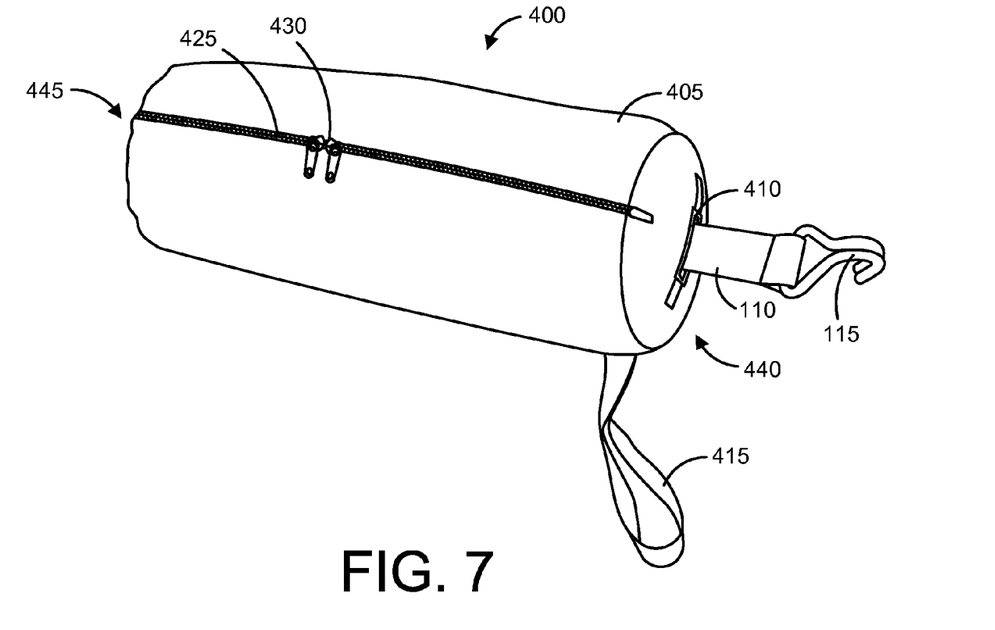
FIG. 7 shows a perspective view of a tie-down apparatus in a partially deployed state, where a first strap and first attachment mechanism of a tie-down device is extending from a first opening in a housing.
Figure 8:
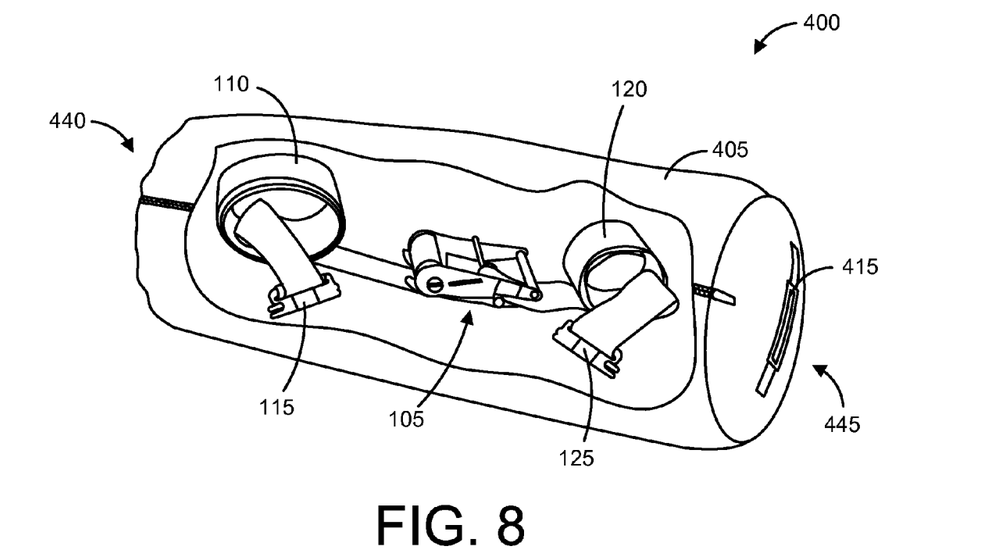
FIG. 8 shows a cutaway top perspective view of a tie-down apparatus in a stowed state, where a tie-down device is stowed within a housing and a primary opening of the housing is closed.
Figure 9:
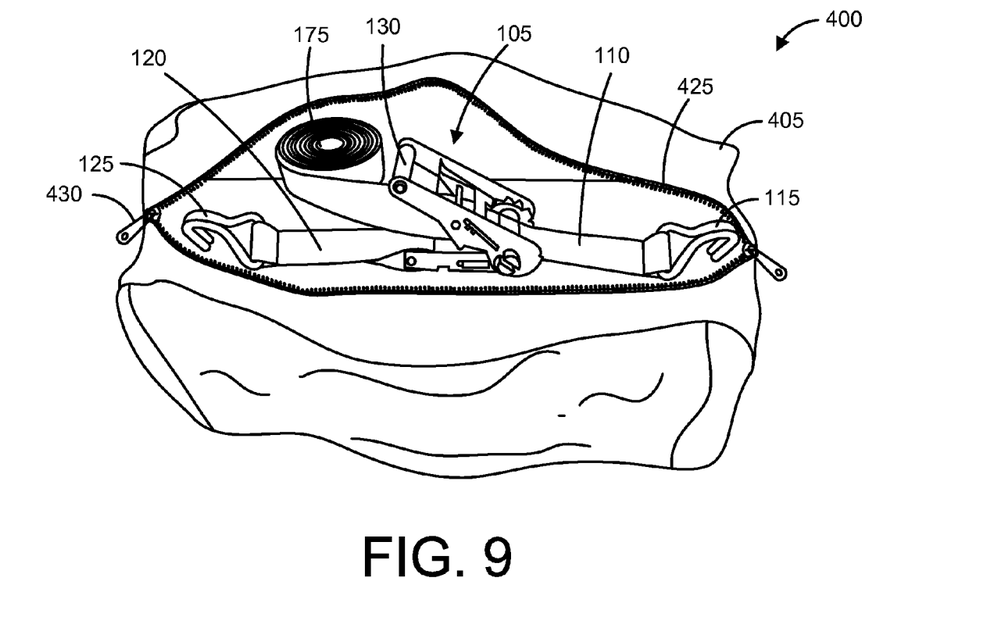
FIG. 9 shows a top perspective view of a tie-down apparatus showing a primary opening of a housing in an opened position, thereby providing access to a tie-down device within the housing.

As shown in FIGS. 6-14, the tie-down apparatus 400 can include a housing 405. The housing 405 can be adapted to receive and stow an entire tie-down device 100 when the tie-down device is not being used, as shown in FIGS. 8 and 9. The housing 405 can include an interior volume that is sufficiently large to accommodate all parts of the tie-down device 100 (e.g. ratchet assembly 105, fixed length strap 120, and adjustable length strap 110). By accommodating the entire tie down device 100, the tie down device can be stored neatly without becoming entangled with a second tie down device. For instance, if two tie-down devices 100 are stowed, each in its own housing 405, the housings will prevent the two tie-down devices from becoming entangled. In one example, an enclosure, such as a duffle bag, can be provided to store two or more tie-down apparatuses 400, thereby providing a self-contained solution for securing cargo 300 that requires multiple tie-downs devices during transport to ensure safe transport.

The housing 405 can include a primary opening 425 that provides access to the inner volume of the housing, as shown in FIG. 9. The primary opening 425 can permit a user to easily insert the tie-down device 100 into the inner volume of the housing 405 when transitioning to a stowed state. In one example, the primary opening 425 can be sufficiently large to accommodate at least one hand of a user. In another example, the primary opening 425 can be sufficiently large to accommodate two hands of a user, which can allow the user to operate various components of the ratchet assembly 105, such as the ratchet handle 130, release handle 165, or ratchet locking mechanism 170.

The primary opening 425 can be closable by a closure mechanism 430. The closure mechanism 430 can allow for quick and easy opening and closing of the primary opening 425 in the housing 405. The closure mechanism 430 can include any suitable closure mechanism. In one example, shown in FIG. 9, the closure mechanism 430 can include a zipper. The zipper can have a large zipper pull to permit a user wearing gloves (e.g. in cold weather conditions) to easily open and close the zipper. The zipper can be corrosion-resistant to avoid degradation of the zipper caused by road salt or precipitation.

In another example, the closure mechanism 430 can be a spring closure, which can allow the primary opening 425 to be readily opened and closed. The spring closure can also allow the opening to remain in either the opened or closed position. By holding the primary opening 425 in an opened position, the spring closure can provide a user with easy access to the ratchet assembly 105 inside the housing 405, thereby making it easier to operate the ratchet assembly (e.g. to tension or release the ratchet strap). The spring closure can be any suitable type of spring closure. In one example, the spring closure can be similar to a spring closure described in U.S. Pat. No. 2,084,757 to Alter, which is hereby incorporated by reference in its entirety.

Figure 19:
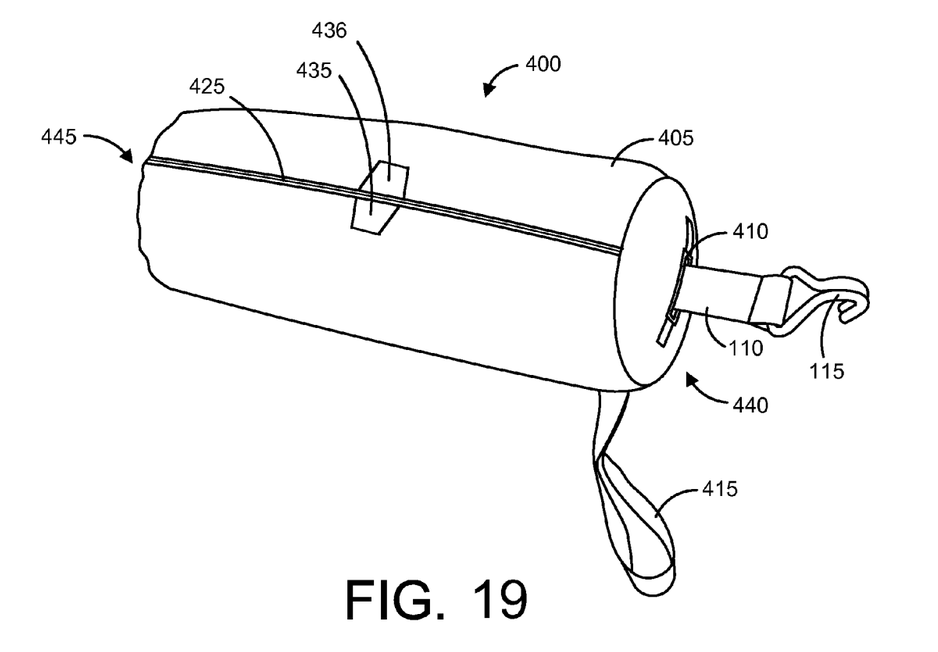
FIG. 19 shows a perspective view of a tie-down apparatus in a partially deployed state, where a first strap and first attachment mechanism of a tie-down device is extending from a first opening in a housing, and where the housing includes a first pull tab and a second pull tab each affixed to the outer surface of the housing.

If the closure mechanism 430 is a spring closure, the housing 405 can include pull tabs (435, 436) positioned along opposing sides of the primary opening 425, as shown in FIG. 19. The pull tabs (435, 436) can serve as finger grips to facilitate opening and closing of the closure mechanism 430. In one example, the spring closure can include a pair of spring strip members extending in parallel along opposing edges of the primary opening 425 and attached to the housing 405 (e.g. stitched within a hem). The pair of spring strip members can be connected by pivot joints at both ends. The pivot joints can permit one or both of the spring strip members to be transitioned away from a parallel configuration that exists when the closure mechanism is closed. In one example, the pivot joints can permit both spring strip members to bow outward, thereby producing an oval shaped primary opening 425 that remains in an opened position until the user closes the spring closure.

Figure 10:
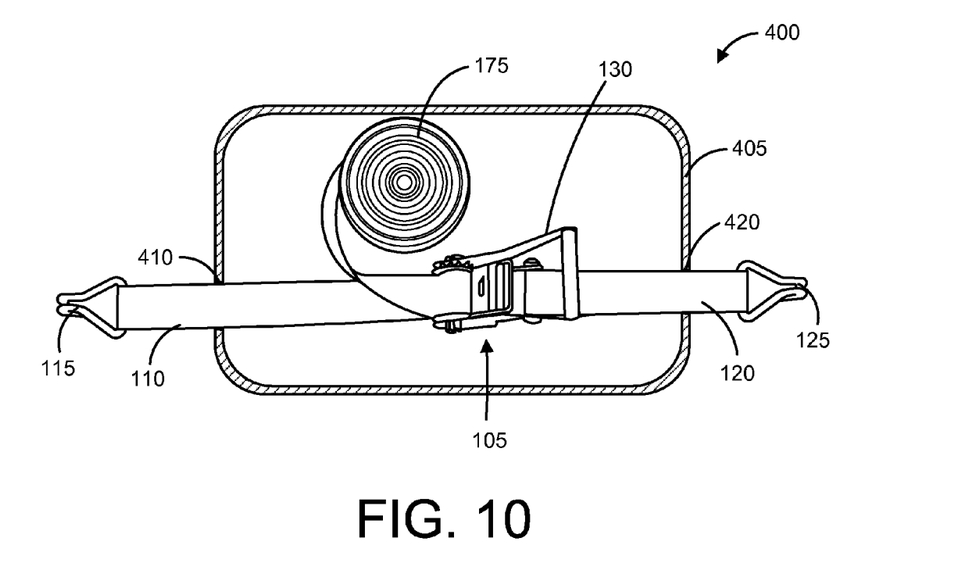
FIG. 10 shows a cutaway top view of a tie-down apparatus showing a tie-down device and extending through a housing, where the housing has one compartment adapted to house the ratchet assembly of the tie-down device.
Figure 11:
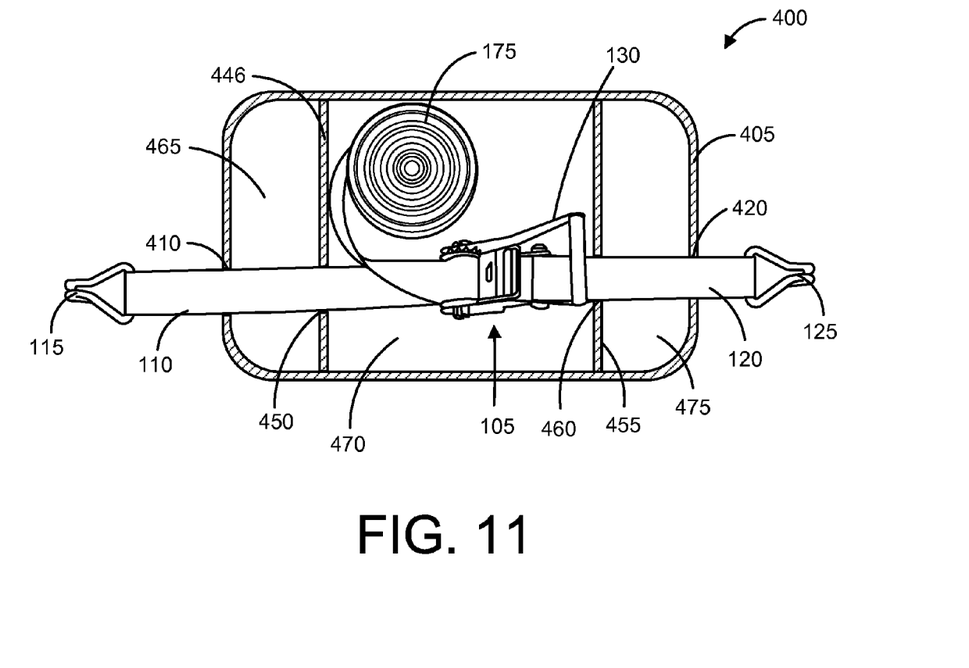
FIG. 11 shows a cutaway top view of a tie-down apparatus showing a tie-down device extending through a housing, where the housing has three compartments each adapted to house a portion of the tie-down device.

The housing 405 can include a first opening 410 adapted to allow the adjustable length strap 110 to pass through the housing, as shown in FIGS. 7, 10, and 11. The first opening 410 can be located on any suitable surface of the housing 405. In one example, the first opening 410 can be located proximate a first end 440 of the housing 405. The first opening 410 can be a first slit with a shape that is similar to a cross-sectional shape of the adjustable length strap 110 (e.g. rectangular). Alternately, the first opening 410 can have any other suitable shape that allows the adjustable length strap 110 to pass through it.

The housing 405 can include a second opening 420 adapted to allow the fixed length strap 120 to pass through the housing, as shown in FIGS. 10 and 11. The second opening 420 can be located on any suitable surface of the housing 405. In one example, the second opening 420 can be located proximate a second end 445 of the housing 405. The first opening 410 can be a first slit with a shape that is similar to a cross-sectional shape of the adjustable length strap 110 (e.g. rectangular). Alternately, the second opening 420 can have any other suitable shape that allows the fixed length strap 120 to pass through it.

The first and second slits (410, 420) can accommodate the adjustable and fixed length straps (110, 120), respectively. The first and second slits (410, 420) can each have a suitable size and shape that permits a hook and strap to be fed through the slit when transitioning to the deployed state. In particular, the first slit 410 can have a size and shape that is suitable to feed the first attachment mechanism 115 and a portion of the first strap 110 (e.g. adjustable length strap) through the first slit, as shown in FIG. 7. Likewise, the second slit 420 can have a size and shape that is suitable to feed the second attachment mechanism 125 and a portion of the second strap 120 (e.g. fixed length strap) through the second slit.

In one example, the first and second openings (410, 420) can be made from an elastic material such as, for example, any suitable rubber or polymer material. Being constructed from an elastic material can allow the first and second openings (410, 420) to be significantly smaller than the maximum width of the attachment mechanisms (115, 125) that need to pass through the first and second openings. The first opening 410 can stretch to accommodate insertion of the first attachment mechanism 115 (e.g. hook) through the first opening. In one example, the first opening can have a surface area of about 0.003-0.015, 0.015-0.25, 0.25-0.5, or 0.5-1.0 square inches. Likewise, the second opening 420 can stretch to accommodate insertion of the second attachment mechanism 125 (e.g. hook) through the second opening. In one example, the second opening can have a surface area of about 0.003-0.015, 0.015-0.25, 0.25-0.5, or 0.5-1.0 square inches.

Figure 12:
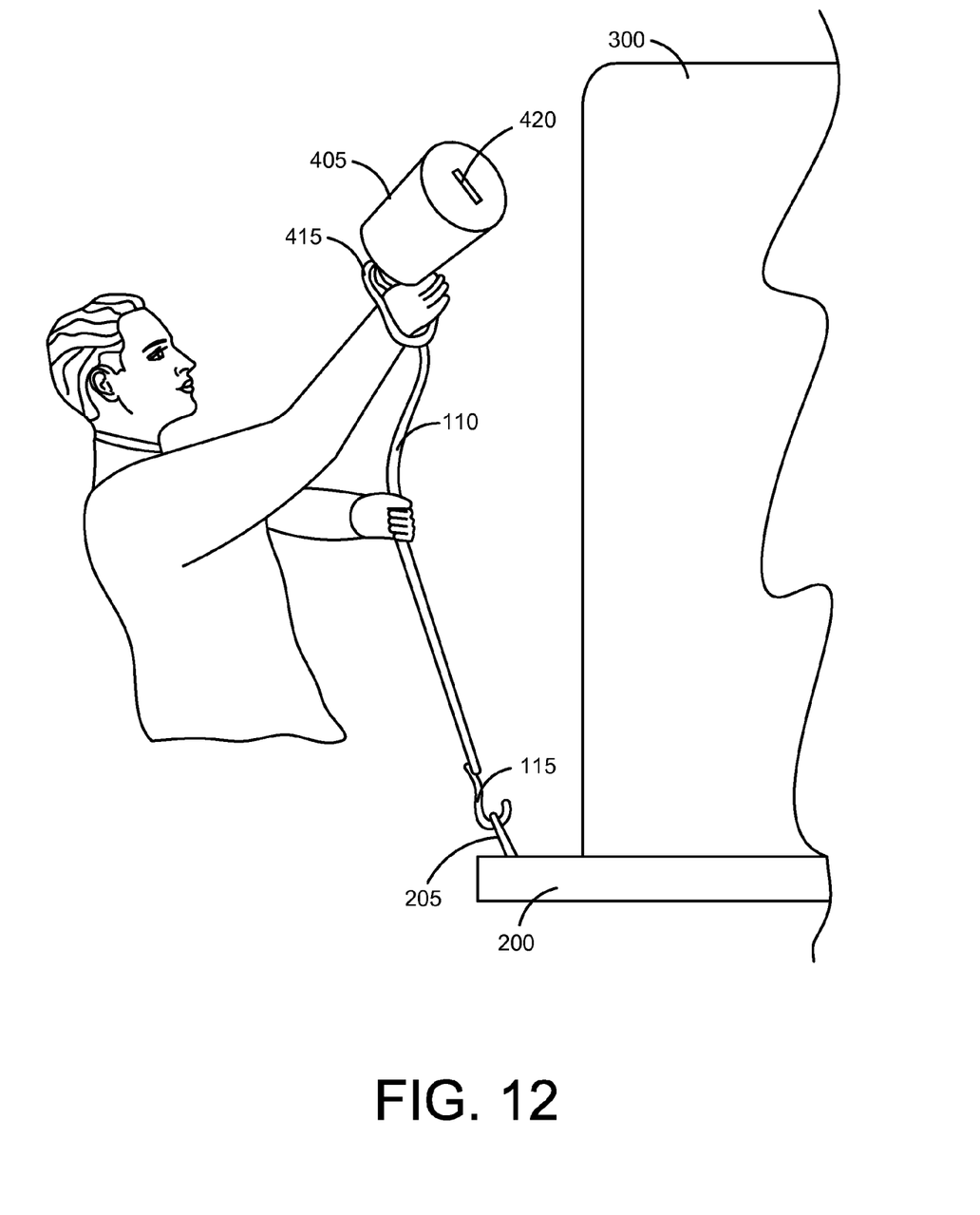
FIG. 12 shows a user deploying a tie-down apparatus by tossing a housing over a piece of cargo after attaching a first attachment mechanism of a tie-down device to a first attachment point on a cargo platform.

The cargo tie-down apparatus 400 described herein provides many advantages over the cargo tie-down apparatus described in Surdam. In particular, the cargo tie-down apparatus 400 described herein allows for rapid deployment without risk of scratching or damaging the cargo 300. When deploying the cargo tie-down apparatus (e.g. transitioning from a stowed state to a deployed state), the user may begin with the tie-down device 100 contained entirely in the housing 405 and the closure mechanism 430 in a closed position, as shown in FIG. 1. The user can first open the closure mechanism 430 to gain access to the interior volume of the housing 405, as shown in FIG. 9. The user can then reach inside the housing 405 and feed the first attachment mechanism 115 (e.g. first hook) and a portion of the first strap 110 (e.g. adjustable length strap) of the tie-down device 100 through the first opening in the housing 405. The first attachment mechanism 115, which is connected to the end of the adjustable length strap 110, can then be secured to a first attachment point 205 (e.g. D-ring, rope ring, tie down ring, rotating rope ring, E-track fitting, or L-track fitting) on, for example, a cargo platform 200, such as a truck bed or trailer. The ratchet assembly 105 can then be set to an unlocked position to permit the adjustable length strap to be drawn freely from the ratchet axle 135. The closure mechanism 430 can then be closed to retain the remaining components of the tie-down device (e.g. ratchet assembly 105, fixed length strap 120, second attachment mechanism 125) safely inside the housing 405. The user can then toss the housing 405 over the cargo 300 while the first attachment mechanism 115 remains attached to the first attachment point 205 of the cargo platform 200, as shown in FIG. 12. This process can resemble a person tossing a throw bag to a stranded swimmer, where the person tossing the bag holds one end of the rope, and additional rope freely spools from the throw bag as it travels through the air to the stranded swimmer. After the housing 405 has been tossed over the cargo 300, the user can walk around to the other side of the cargo to retrieve the housing, as shown in FIG. 13. The user can then open the closure mechanism 430 of the housing 405 to once again gain access to the interior volume of the housing. The user can then reach inside the housing 405 and feed the second attachment mechanism 125 (e.g. second hook) and a portion of the second strap 120 (e.g. fixed length strap) though the second opening 420 in the housing. The second attachment mechanism 125, which is connected to an end of the fixed length strap 120, can then be secured to a second attachment point 210 (e.g. D-ring, rope ring, tie down ring, rotating rope ring, E-track fitting, or L-track fitting) on the cargo platform 200. The user can then reach into the interior volume of the housing 405 and actuate the ratchet handle to tension the tie-down device 100 and thereby secure the cargo 300. Once the tie-down device 100 has been properly tensioned, the user can stuff the excess strap 175 from the adjustable length strap 110 into the housing 405 and close the closure mechanism 405 to seal the primary opening 425, as shown in FIG. 14.

During the tossing step, it may be desirable to restrict how freely the adjustable length strap 110 spools from the ratchet axle 135 of the ratchet assembly 105 and the first opening 410 in the housing 405, for example, to prevent the adjustable length strap 110 from pulling entirely free of the ratchet assembly 105 and becoming disconnected from the housing 405. Proper restriction of the spooling rate can be accomplished by increasing the torque required to rotate the ratchet axle 135 by, for example, including an adjustable brake on the ratchet axle. Alternately, proper restriction of the spooling rate can be accomplished by having the first opening 410 exert a friction force on the adjustable length strap 110 as it passes through the housing 405 during the tossing step. In one example, the friction force can be achieved by providing an interference fit between the adjustable length strap 110 and the first opening 410 by making the first opening slightly smaller than the cross-sectional area of the adjustable length strap.

Figure 17:
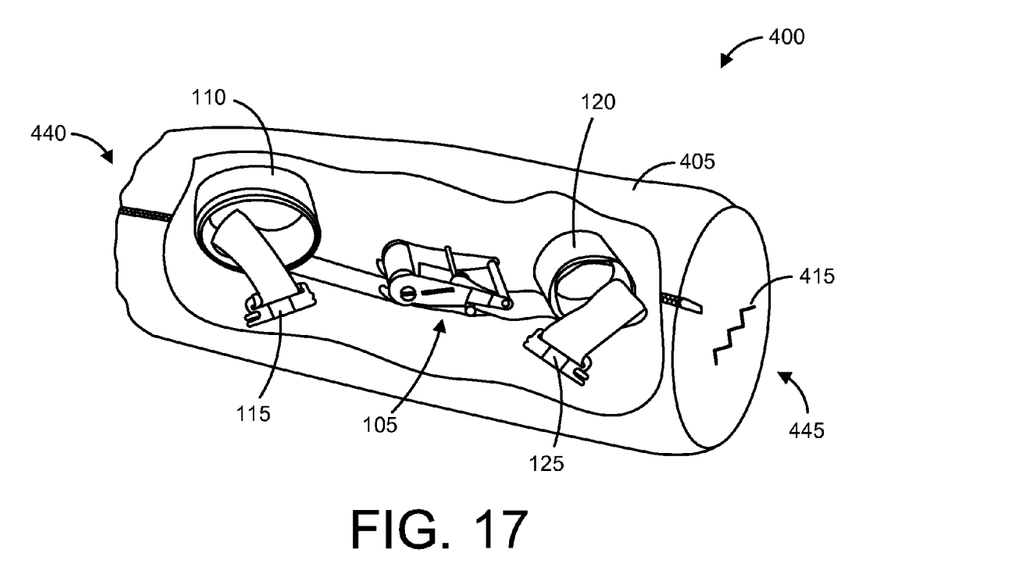
FIG. 17 shows a perspective view of a tie-down apparatus in a stowed state with a sawtooth-shaped cut in the housing to form the second opening.
Figure 18:
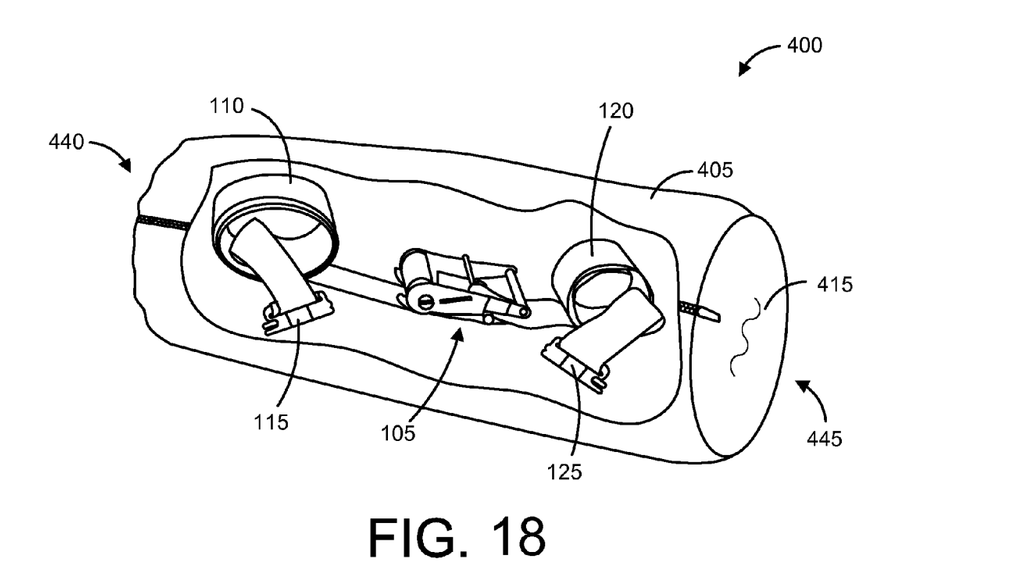
FIG. 18 shows a perspective view of a tie-down apparatus in a stowed state with a sinusoidal wave-shaped cut in the housing to form the second opening.

In another example, the friction force can be achieved by providing a first opening 410 with a non-linear perimeter. The first opening 410 can have a sinusoidal-shaped perimeter (e.g. similar to the second opening 415 shown in FIG. 17), a non-sinusoidal-shaped perimeter (e.g. square wave-shaped perimeter or sawtooth-shaped perimeter), or any other suitably shaped perimeter that provides a friction force against the adjustable length strap 110 as it passes through the first opening 410 in the housing 405 during the tossing step. In one example, the first opening 410 can be formed by a sawtooth-shaped cut (e.g. similar to the second opening 415 shown in FIG. 18) in the housing 405 that forms a top sawtooth portion and a bottom sawtooth portion that provide friction forces against a top surface and a bottom surface of the adjustable length strap 110 as it passes through the first opening 410 during the tossing step. When the tie-down apparatus 400 is in a stowed state, the top sawtooth portion and the bottom sawtooth portion adjacent to the sawtooth-shaped cut (i.e. the first opening 410) may naturally fit together to seal the first opening and prevent debris or liquids from entering the first opening.

In another example, the first opening 410 can be formed by a sinusoidal wave-shaped cut in the housing that forms a top wave portion and a bottom wave portion that provide friction forces against a top and bottom surface of the adjustable length strap as it passes through the first opening during the tossing step. When the tie-down apparatus is in a stowed state, the top wave portion and the bottom wave portion adjacent to the sinusoidal wave-shaped cut (i.e. the first opening 410) may naturally fit together to seal the first opening and prevent debris or liquids from entering the first opening.

The housing 405 can include a padding layer on an inner or outer surface to protect the cargo 300 from metal portions of the tie-down device 100 (e.g. ratchet assembly 105 and hooks 115, 120). The padding layer can have a sufficient thickness such that even if the housing 405 strikes the cargo 300 when tossed over the cargo during the deployment process, the metal portions housed inside the housing will not cause damage to the cargo upon impact.

The padding layer can include any suitable material such as, for example, foam rubber, neoprene rubber, cross-linked polyethylene, polyethylene foam, polystyrene foam, or butyl rubber. If the padding layer is positioned on an outer surface of the housing 405, the padding layer will preferably be made of a material (e.g. closed cell foam) that does not absorb water or degrade in performance when wet. In one example, the padding layer can have a thickness of about 0.25-2.0, 0.5-2.0, 0.5-1.5 or 0.5-1.0 inches.

The housing 405 can include a handle 415, as shown in FIG. 6. The handle 415 can be attached to an outer surface of the housing 405. The handle 415 can serve at least three purposes. First, the handle 415 can be used to conveniently carry the tie-down apparatus 400 when in a stowed state. Second, the handle 415, which can be a throw handle, can be used to facilitate tossing the housing 405 over the cargo during the deployment process, as shown in FIG. 12. The throw handle 415 can allow the user to more accurately toss the apparatus, similar to how a handle on a throw bag allows a user to more accurately toss the throw bag to a stranded swimmer. Third, the handle 415 can be used as an attachment point to secure the housing 405 to, for example, the cargo platform 200 or the cargo 300 when deployed to ensure that the tie-down apparatus 400 does not fall onto the roadway if the first and second attachment mechanisms (115, 125) become detached from the first and second attachment points (205, 210) on the cargo platform 200 during transport.

When transporting cargo on a flatbed trailer, an existing tie-down device 100 will occasionally come free from its attachment points (205, 210) on the trailer 200. When this happens, it is common for the existing tie-down device 100 to fall from the trailer and land on the roadway. The existing tie-down device 100 then poses significant risks to other vehicles (e.g. automobiles or motorcycles) and passengers in or on those vehicles that are traveling on the roadway. For instance, other vehicles may run over the tie-down device causing a blowout of a tire, which can result in an accident. Also, when the tie-down device falls from, or is blown off of, the trailer, the tie-down device may strike a vehicle and potentially shatter a windshield of the vehicle and cause an accident. To avoid these risks, and other similar risks, it can be desirable to ensure that the tie-down apparatus 400 described herein is unable to fall from the trailer 200 even if the first and second attachment mechanisms (115, 125) become disconnected from the first and second attachment points (205, 210), respectively, on the trailer. A tether can connect a tether point (e.g. D-ring, rope ring, tie down ring, rotating rope ring, E-track fitting, or L-track fitting) on the trailer 200 to the handle 415 of the housing 405. In one example, the tether can be retractable tether that retracts into a tether housing. As a result of this retractable feature, if the first and second attachment mechanisms (115, 120) unintentionally become disconnected from the first and second attachment points (205, 210) during transport of cargo 300, the tether can retract into the tether housing, thereby drawing the tie-down apparatus 400 toward the tether housing and preventing the tie-down apparatus from falling onto the roadway and harming other vehicles or occupants of those vehicles. In addition, the retractable tether can prevent damage or loss of the tie-down apparatus 400, which ensures the user will not need to purchase a replacement tie-down apparatus if the first and second attachment mechanism (115, 125) come free of the first and second attachment points (205, 210) during use.

When transporting cargo in cold, wet, muddy, sandy, or salty conditions, it is desirable to prevent the ratchet assembly 105 from getting wet and freezing or seizing. To meet this objective, it is desirable for the housing 405 to provide a protective barrier that completely encloses and surrounds the ratchet assembly 105. The closure mechanism 430 can prevent water from freely entering the interior volume of the housing. In one example, the closure mechanism can include a waterproof zipper. The housing 405 can be made of any suitable waterproof proof or water-resistant material. In some examples, the housing 405 can be made of waterproof fabric or plastic-coated fabric (e.g. polyurethane-coated nylon), similar to materials used to construct dry bags for outdoor activities, such as canoeing, kayaking, and white-water rafting. The housing 405 can include seam tape on inner seams to cover over any needle holes.

To further prevent ingress of liquids or other debris into the interior volume of the housing 405, the first and second openings (e.g. first and second slits) can be adapted to seal against the first and second straps (110, 120), respectively. In one example, the first and second openings (415, 420) can each include a seal adapted to press against the respective strap (e.g. 110 or 120) on an upper and lower surface of each strap. Specifically, the first opening 410 can include a first seal adapted to provide friction against the adjustable length strap 110, and the second opening 420 can include a second seal adapted to provide friction against the fixed length strap 120. The first and second seals can be made of any suitable material. In one example, the first and second seals can be made of a flexible and durable material such as, for example, butyl rubber or neoprene. The first and second seals can prevent water from running down a respective strap (e.g. 110 or 120) and entering the housing 405 through a respective opening (e.g. 410 or 420).

The tie-down apparatus described herein can be used to secure a wide variety of cargo, including automobiles, ATVs, PUVs, snowmobiles, motorcycles, dirt bikes, classic and antique vehicles, construction equipment, gear for hunting, fishing, and camping, landscaping equipment, wind turbine components, oil pipeline components, and trees. The tie-down apparatus described herein can be useful across a wide variety of industries, including moving and storage, construction, nursery and orchard, oil and gas, surveying, seismology, trucking, transportation, towing, welding, and pipefitting.

In one example, a tie-down apparatus 400 for securing cargo 300 can be transitionable from a stowed state (as shown in FIG. 6) to a deployed state (as shown in FIG. 14). The tie-down apparatus 400 can include a tie-down device 100, which can include a ratchet assembly 105, an adjustable length strap 110 attached to a first end 140 of the ratchet assembly, as shown in FIG. 2. The adjustable length strap 110 can include a first attachment mechanism 115 affixed to a distal end of the adjustable length strap 110, as shown in FIG. 1. The tie-down device 100 can also include a fixed length strap 120 attached to a second end of the ratchet assembly 145, as shown in FIG. 2. The fixed length strap 120 can include a second attachment mechanism 125 affixed to a distal end of the fixed length strap, as shown in FIG. 1. The tie-down apparatus 400 can also include a housing 405, as shown in FIG. 9. The housing 405 can include an interior volume accessible through a primary opening 425 in the housing, a closure mechanism 430 adapted to close the primary opening, a first opening 410 in the housing, and a second opening 420 in the housing. The interior volume of the housing 405 can be adapted to receive and stow the ratchet assembly 105, the adjustable length strap 110, the first attachment mechanism 115, the fixed length strap 120, and the second attachment mechanism 125 when the tie-down apparatus is in the stowed state, as shown in FIG. 8. When the tie-down apparatus is in the deployed state, as shown in FIG. 14, the adjustable length strap 110 extends through the first opening 410 in the housing 405, the fixed length strap 120 extends through the second opening 420 in the housing, and the ratchet assembly 105 is housed in the interior volume of the housing.

The housing 405 can include a closure mechanism 430 that allows the primary opening 425 to be opened to access the ratchet assembly 105 and closed to conceal the ratchet assembly. The first opening 410 can be adapted to provide friction force against a surface of the adjustable length strap 110 when the tie-down apparatus 400 is in the deployed state.

In one example, the first opening 410 can be formed by a sinusoidal wave-shaped cut in the housing 405, and the cut can produce a top wave-shaped portion and a bottom wave-shaped portion. The top wave-shaped portion can provide a friction force against a top surface of the adjustable length strap 110, and the bottom wave-shaped portion can provide a friction force against a bottom surface of the adjustable length strap. The first opening 410 can include a seal that is adapted to provide friction force against a surface of the adjustable length strap 110 when the tie-down apparatus 400 is in the deployed state.

The housing 405 can include a first divider 446 and a second divider 455 that establish three compartments (e.g. 465, 470, 475) within the interior volume of the housing. FIG. 11 shows the tie-down apparatus 400 in a deployed state with three compartments. The first divider 446 can include a first divider opening 450 that the adjustable length strap 110 passes through. The second divider 455 can include a second divider opening that the fixed length strap 120 passes through. The first and second divider openings (450, 460) can be adapted to prevent water, snow, or debris from accessing the third compartment 470 (i.e. the middle compartment). In one example, the first and second divider openings (450, 460) can be made from an elastic material such as, for example, any suitable rubber or polymer material. Being constructed from an elastic material can allow the first and second divider openings (450, 460) to be significantly smaller than the maximum width of the attachment mechanisms (115, 125) that need to pass through the first and second openings during transition from the stowed state to the deployed state. The first divider opening 450 can stretch to accommodate insertion of the first attachment mechanism 115 (e.g. hook) through the first opening. In one example, the first divider opening 450 can have an area of about 0.003-0.015, 0.015-0.25, 0.25-0.5, or 0.5-1.0 square inches. Likewise, the second divider opening 460 can stretch to accommodate insertion of the second attachment mechanism 125 (e.g. hook) through the second divider opening. In one example, the second divider opening 460 can have a surface area of about 0.003-0.015, 0.015-0.25, 0.25-0.5, or 0.5-1.0 square inches. When the tie-down apparatus is in a stowed state, the first compartment 465 can be adapted to store the adjustable length strap 110, the second compartment 475 can be adapted to store the fixed length strap 120, and the third compartment 470 (i.e. middle compartment) can be adapted to store the ratchet assembly 105 and the excess strap 175.

The housing 405 can include a throw handle 415 to facilitate tossing of the housing when transitioning from the stowed state to the deployed state, as shown in FIG. 12. In one example, the housing 405 can include a padding layer to prevent damage to cargo when the tie-down apparatus is being tossed over the cargo (i.e. partially deployed as shown in FIGS. 12 and 13) or when the tie-down apparatus is fully deployed (as shown in FIG. 14).

In yet another example, a housing 405 can be adapted to receive a tie-down device 100. The housing can include a primary opening 425 that provides access to an interior volume of the housing. The interior volume of the housing can be sufficiently large to receive the tie-down device 100. The housing 405 can include a first opening 410 in a first end 440 of the housing. The first opening 410 can be adapted to allow a first attachment mechanism 115 and an adjustable length strap 110 of the tie-down device 100 to be fed through the first opening when the tie-down device is present. The housing 405 can include a second opening 420 in a second end 445 of the housing. The second opening 420 can be adapted to allow a second attachment mechanism 125 and a fixed length strap 120 of the tie-down device 100 to be fed through the second opening 420 when the tie-down device is present. The housing can include a closure mechanism 430 that is adapted to permit the primary opening 425 in the housing to be opened and closed, as shown in FIGS. 9 and 6, respectively. The primary opening 425 in the housing 405 can be sufficiently large when opened to allow a user to insert at least one hand though the primary opening and into the interior volume of the housing to actuate the ratchet assembly 105 when the tie-down device 100 is present.

In one example, the closure mechanism 430 can be a spring closure. In this example, the housing 405 can include a first pull tab 435 and a second pull tab 436 each affixed to the outer surface of the housing 405, as shown in FIG. 19. The first and second pull tabs can be located on opposing sides of the primary opening 425 to permit a user to pull open the spring closure relatively easily. The first and second pull tabs can be large enough to permit a user with gloved hands to easily grasp the pull tabs and open the primary opening 425.

A method for securing cargo on a cargo platform can include providing a tie-down apparatus 400 having a housing 405 and a tie-down device 100 disposed within an interior volume of the housing. The method can include opening a closure mechanism 430 on the housing 405 to access the interior volume of the housing. The method can include reaching inside the housing and feeding an adjustable length strap 110 of the tie-down device 100 through a first opening 410 in the housing. The adjustable length strap 110 can include a first attachment mechanism 115 affixed to a distal end of the adjustable length strap. The method can include securing the first attachment mechanism of the tie-down device to a first attachment point 205 on the cargo platform 200. The method can then include closing the closure mechanism to retain the ratchet assembly 105, fixed length strap 120, and second attachment mechanism 125 safely within the housing prior to a tossing step to prevent damage to the cargo 300. The method can include tossing the housing 405 over the cargo 300, as shown in FIG. 12. The method can then include opening the closure mechanism, reaching inside the interior volume of the housing 405, and feeding the fixed length strap 120 of the tie-down device 100 through a second opening 420 in the housing. The fixed length strap 120 can include a second attachment mechanism 125 affixed to a distal end of the fixed length strap. The method can then include securing the second attachment mechanism 125 of the tie-down device 100 to a second attachment point 210 on the cargo platform 200. The method can then include tensioning the tie-down device 100 by actuating a ratchet handle 105 housed within the housing 405, where tensioning the tie-down device secures the cargo 300 on the cargo platform 200, as shown in FIG. 14.

The concepts described herein and defined by the enumerated claims may be better understood by referring to the description, which should be read in conjunction with the accompanying figures. The descriptions of certain embodiments are set out to enable one to build and use implementations of the invention, and are not intended to limit the enumerated claims, but rather to serve as particular examples thereof. Those skilled in the art should appreciate that they may readily use the conception of specific embodiments disclosed as a basis for modifying or designing other methods and systems for carrying out the same purposes. Those skilled in the art should also realize that such equivalent assemblies do not depart from the spirit and scope of the invention in its broadest form.

What is claimed is:

1. A housing adapted to receive a tie-down device, the housing comprising:
   a primary opening that provides access to an interior volume of the housing, wherein the interior volume is sufficiently large to receive a tie-down device, the tie-down device comprising: a ratchet assembly; an adjustable length strap attached to a first end of the ratchet assembly and comprising a first attachment mechanism; and a fixed length strap attached to a second end of the ratchet assembly and comprising a second attachment mechanism;
   a first opening in a first end of the housing, wherein the first opening is adapted to allow the first attachment mechanism and the adjustable length strap of the tie-down device to be fed through the first opening when the tie-down device is present, wherein the first opening comprises an elastic material configured to stretch to accommodate insertion of the first attachment mechanism when the tie-down device is present;
   a second opening in a second end of the housing, wherein the second opening is adapted to allow the second attachment mechanism and the fixed length strap of the tie-down device to be fed through the second opening when the tie-down device is present; and
   a closure mechanism adapted to permit the primary opening in the housing to be opened and closed, wherein the primary opening when opened allows a user to insert at least one hand through the primary opening and into the interior volume of the housing to actuate the ratchet assembly when the tie-down device is present.

2. The housing of claim 1, wherein the first opening comprises a first seal, and wherein the second opening comprises a second seal, wherein the first seal is configured to prevent ingress of liquids or debris into the interior volume of the housing through the first opening, and wherein the second seal is configured to prevent ingress of liquids or debris into the interior volume of the housing through the second opening.

3. The housing of claim 1, further comprising a first divider and a second divider within the housing, wherein the first divider and second divider together with an interior surface of the housing form three compartments within the interior volume of the housing.

4. The housing of claim 1, further comprising a throw handle affixed to an outer surface of the housing.

5. The housing of claim 1, further comprising a padding layer on an inner or outer surface of the housing to prevent the tie-down device from damaging cargo.

6. The housing of claim 1, further comprising seam tape on an inner seam of the housing to prevent water ingress into the interior volume of the housing.

7. The housing of claim 1, wherein the housing is waterproof and comprises polyurethane-coated nylon.

8. The housing of claim 1, wherein the closure mechanism is a zipper.

9. The housing of claim 1, wherein the closure mechanism is a spring closure.

10. The housing of claim 9, further comprising a first pull tab and a second pull tab each affixed to the housing, the first and second pull tabs being located on opposing sides of the primary opening and configured to permit opening of the spring closure.

11. The housing of claim 1, wherein the first opening is adapted to provide a friction force against a surface of the adjustable length strap when the tie-down apparatus is present and in a deployed state, wherein the friction force is configured to restrict a spooling rate during a tossing step.

12. The housing of claim 1, wherein the second opening is adapted to provide a friction force against a surface of the fixed length strap when the tie-down apparatus is present and in a deployed state.

13. The housing of claim 1, wherein the first opening is formed by a sinusoidal wave-shaped cut in the housing, the cut establishing a top wave-shaped portion and a bottom wave-shaped portion, wherein the top wave-shaped portion provides a friction force against a top surface of the adjustable length strap and the bottom wave-shaped portion provides friction force against a bottom surface of the adjustable length strap when the tie-down apparatus is present.

14. The housing of claim 1, wherein the first opening comprises a first seal that is adapted to provide a friction force against a surface of the adjustable length strap when the tie-down apparatus is present and in a deployed state, wherein the first seal is configured to prevent ingress of liquids or debris into the interior volume of the housing through the first opening.

15. The housing of claim 1, wherein the second opening comprises a seal that is adapted to provide friction force against a surface of the fixed length strap when the tie-down apparatus is in a deployed state, wherein the seal is configured to prevent ingress of liquids or debris into the interior volume of the housing through the second opening.

16. The housing of claim 1, wherein the housing is configured to enclose and surround the ratchet assembly when the tie-down device is present to protect the ratchet assembly from being exposed to water and freezing and thereby becoming inoperable in cold and wet conditions.

17. The housing of claim 1, wherein the closure mechanism comprises a zipper, the zipper comprising a large zipper pull to permit a user wearing gloves to easily open and close the zipper.

18. The housing of claim 3, further comprising: a first divider opening in the first divider; and a second divider opening in the second divider, wherein the three compartments comprise a first compartment, a second compartment, and a middle compartment.

19. The housing of claim 1, wherein the first opening has an area of about 0.003-0.015, 0.015-0.25, 0.25-0.5, or 0.5-1.0 square inches.

* * * * *